US011608227B2

United States Patent
Cohen et al.

(10) Patent No.: US 11,608,227 B2
(45) Date of Patent: Mar. 21, 2023

(54) MOTION-MODE SWITCHING MODULE FOR LIFT ROBOTS

(71) Applicant: Commonsense Robotics, Ltd., Tel Aviv (IL)

(72) Inventors: Shay Cohen, Shoham (IL); Guy Blotnik, Tel Aviv (IL); Nadav Laor, Hod Hasharon (IL); Asaf Kaufman, Tal Shahar (IL); Bar Cohen, Hod Hasharon (IL)

(73) Assignee: GET FABRIC LTD., Tel Aviv (IL)

( * ) Notice: Subject to any disclaimer, the term of this patent is extended or adjusted under 35 U.S.C. 154(b) by 812 days.

(21) Appl. No.: 16/479,715

(22) PCT Filed: Feb. 21, 2018

(86) PCT No.: PCT/IL2018/050200
§ 371 (c)(1),
(2) Date: Jul. 22, 2019

(87) PCT Pub. No.: WO2018/154574
PCT Pub. Date: Aug. 30, 2018

(65) Prior Publication Data
US 2021/0009350 A1   Jan. 14, 2021

Related U.S. Application Data

(60) Provisional application No. 62/461,243, filed on Feb. 21, 2017.

(51) Int. Cl.
*B65G 1/04* (2006.01)
*B65G 1/06* (2006.01)
(Continued)

(52) U.S. Cl.
CPC .......... *B65G 1/0414* (2013.01); *B25J 9/1035* (2013.01); *B61F 99/00* (2013.01); *B65G 1/0492* (2013.01);
(Continued)

(58) Field of Classification Search
CPC .... B65G 1/0414; B65G 1/0492; B65G 1/065; B65G 2203/0208; B65G 1/04;
(Continued)

(56) References Cited

U.S. PATENT DOCUMENTS 3,880,299 A * 4/1975 Zollinger ............... G06Q 10/08
                                                          414/273
5,562,062 A * 10/1996 Upmeyer ............. B65G 1/0414
                                                          114/72

(Continued)

FOREIGN PATENT DOCUMENTS

FR          2685306 A1    6/1993
WO      2016199033 A1    12/2016

OTHER PUBLICATIONS

PCT/ISR/210 Search Report dated May 30, 2018 (pp. 3).

*Primary Examiner* — Thomas Randazzo
(74) *Attorney, Agent, or Firm* — Tutunjian & Bitetto, P.C.

(57) ABSTRACT

A direction switching module for lift robots using a pair of pinions coupled to a rack for propelling vertically and horizontally according to the track's orientation, is disclosed. In a linear motion mode both pinions rotate in the same velocity. In a direction switching mode, when changing from vertical to horizontal motion mode and vise versa, the module is capable of propelling one pinion on a vertical track and its counterpart on a horizontal track, simultaneously, each pinion in a different velocity. A bogie propelled by two pairs of said module is also disclosed, and a controller configured to drive both pinions in same velocity during linear motion and each pinion in a separate appropriate velocity during the direction switching mode. A method for turning a pinion-driven lift-robot in an intersection of rails and a controller for controlling the linear motion modes and the direction switching modes of the lift robot are also disclosed.

17 Claims, 5 Drawing Sheets

(51) Int. Cl.
*B25J 9/10* (2006.01)
*G05B 19/4155* (2006.01)
*B66F 9/06* (2006.01)
*B61F 99/00* (2006.01)
*B61B 13/00* (2006.01)
*B61C 13/00* (2006.01)

(52) U.S. Cl.
CPC .............. *B65G 1/065* (2013.01); *B66F 9/063* (2013.01); *G05B 19/4155* (2013.01); *B61B 13/00* (2013.01); *B61C 13/00* (2013.01); *B65G 2203/0208* (2013.01); *G05B 2219/50362* (2013.01)

(58) Field of Classification Search
CPC ......... B25J 9/1035; B61F 99/00; B66F 9/063; G05B 19/4155; G05B 2219/50362; B61B 13/00; B61C 13/00
See application file for complete search history.

(56) References Cited

U.S. PATENT DOCUMENTS

| | | | |
|---|---|---|---|
| 2014/0031972 A1* | 1/2014 | DeWitt | B65G 1/04 |
| | | | 700/214 |
| 2017/0158430 A1* | 6/2017 | Raizer | B65G 1/065 |
| 2017/0267452 A1* | 9/2017 | Goren | B65G 1/0492 |
| 2017/0313514 A1* | 11/2017 | Lert, Jr. | B65G 1/0478 |
| 2017/0322561 A1* | 11/2017 | Stiernagle | G07F 11/62 |
| 2018/0222676 A1* | 8/2018 | Lindblom | B65G 1/0414 |

* cited by examiner

MOTION-MODE SWITCHING MODULE FOR LIFT ROBOTS

CROSS-REFERENCE TO RELATED APPLICATION

This application claims the benefit of U.S. Provisional Application No. 62/461,243 filed Feb. 21, 2017, entitled "LIFT ROBOT CONFIGURATIONS", which is hereby incorporated by reference in its entirety without giving rise to disavowment.

TECHNICAL FIELD

The present disclosure generally relates to the field of direction-switching mechanisms between horizontal and vertical motion modes for crate carrier robots in logistic distribution centers.

BACKGROUND

Modern logistic centers often make use of conveyors and/or robots in the fully-automated or semi-automated processes of distribution of crates to their designated locations in a shelving array, as well as of returning stored crates from their locations upon demand.

The average costs involved in distribution and retrieval of a given number of crates, per time unit (e.g., an hour, a day), is one of the factors that determine the efficiency of a distribution center. The average costs are influenced by the prices of robots, their number, and the expenses spent on their maintenance. In view of the above, it may be of interest to increase the productivity of robots to be involved in carrying out a given distribution and retrieval activity.

BRIEF SUMMARY

A first broad aspect of the presently disclosed subject matter is a direction switching module for lift robots.

One exemplary embodiment of the direction switching module comprises a first and a second counterpart pinions mounted in serial configuration on a common pivotable-holder, the pinions are couplable to an external rack for traveling along the rack upon rotation of the pinions, wherein an axis of rotation of the first pinion is in parallel orientation to an axis of rotation of the counterpart pinion, the pivotable-holder comprises a pivoting arrangement in a mid-portion thereof and is couplable to a bogie of a lift robot such that the pivotable-holder can pivot about an axis parallel to the axes of the pinions, between a lateral orientation in which the pinions' axes share a horizontal plane and between a vertical orientation in which the pinions' axes share a vertical plane; and a motor, wherein a drive-shaft of the motor is coupled to the axis of a first of the counterpart pinions for driving the pinion in a desired rotation velocity, wherein the second of the counterpart pinions is coupled to a driving mechanism configured to drive the counterpart pinion in a velocity equal to that of the first when both pinions are coupled to a linear rack, and varying with respect of the first when the pinions are coupled one to a vertically oriented rack and the other to a horizontally oriented track.

In various embodiments of the presently disclosed subject matter, the axis of the second pinion is couplable and decouplable from the motor in response to a controlling signal.

In various embodiments of the presently disclosed subject matter, the rotation axis of the second of the pinions is coupled to the motor through a clutch.

In various embodiments of the presently disclosed subject matter, the clutch is coupled to the drive-shaft by means of a transmission belt.

In various embodiments of the presently disclosed subject matter, at least one of the motor and the clutch comprises an electrically controllable brake configured to prevent rotation of at least one of the counterpart pinions upon receiving a break signal from a controller of the lift robot.

In various embodiments of the presently disclosed subject matter, the axis of the second pinion is coupled to a separate motor having a velocity control terminal separated from a velocity control terminal of the first pinion's motor thereby allowing to determine the velocities of the motors separately.

In various embodiments of the presently disclosed subject matter, the separate motor is coupled to or having a brake mechanism configured to prevent rotation of the second of the counterpart pinions upon receiving a break signal from a controller of the lift-robot.

In various embodiments of the presently disclosed subject matter, the direction switching unit is controllably connected to a controller of the robot, wherein the controller is configured to dynamically determine a ratio of rotation velocities between the velocity of the motor coupled to the first of the counterpart pinions and the velocity of the separate motor, wherein the ratio of rotation velocities is inversely proportional to the ratio between (i) the distance of the axis of rotation of the first of the counterpart pinions from a vertical plane in which the axis of rotation of the second of the counterpart pinions is situated, and (ii) the distance of the axis of rotation of the second of the counterpart pinions from a horizontal plane in which the axis of rotation of the first of the counterpart pinions is situated.

In various embodiments of the presently disclosed subject matter, the axis of the second pinion is coupled through a first axis of a differential gear to the drive shaft of the motor to which the first of the counterpart pinions is coupled through a second axis of the differential gear, such that when one pinion happens to rotate faster than the drive-shaft the other pinion rotates respectively slower than the drive shaft, wherein each of the pinions has a dedicated brake configured to prevent idle rotation of the pinion.

In various embodiments of the presently disclosed subject matter, the dedicated brake comprises an actuation lever the actuation lever is configured to release the brake and let the respective pinion rotate upon rotation of the drive shaft when the pinion is coupled to the rack and to brake the pinion upon disengagement from the rack.

In various embodiments of the presently disclosed subject matter, the direction switching unit further comprises an electrical collector configured to contact an external current supply strip extending parallel to the rack.

A second broad aspect of the presently disclosed subject matter is a bogie comprising two pairs of the direction switching module according to said first broad aspect, wherein each direction switching unit is configured to communicate with an electronic controller for comoving with the other direction switching units of the bogie, thereby making the bogie capable of traveling in any desired one of three motion modes without changing the spatial orientation of the bogie, including (i) moving laterally along a horizontally oriented two-rails track; (ii) moving vertically along a pair of vertically oriented two-rails tracks; (iii) moving curvedly while simultaneously utilizing said horizontally oriented track and said vertically oriented pair of tracks; wherein a ratio between simultaneous rotation velocities of a pinion situated in a horizontally oriented rail and of a counterpart pinion situated in a vertically oriented rail is inversely proportional to the ratio between the respective separations between the axes of rotation of the counterpart pinions and the intersection between the vertical and the horizontal planes in which the axes are situated.

In various embodiments of the presently disclosed subject matter, the bogie is further comprising common electronic onboard controller wirelessly communicable with a remote computer.

In various embodiments of the presently disclosed subject matter, the pivotable-holders of the direction switching units are configured to pivot in one of clockwise and counter-clockwise directions for turning from a motion along vertically oriented tracks to a motion along a horizontally oriented track, and to pivot in a direction opposite to the first for turning from a motion along a horizontally oriented track, to a motion along vertically oriented tracks, wherein for heading in a first lateral direction along the horizontally oriented track following a turn from a motion along vertically oriented tracks, the electronic onboard controller is configured to instruct continuous rotation of the pinions in the pivoting direction of the pivotable-holder, wherein for heading in a second lateral direction opposite said first lateral direction along the horizontally oriented track following a turn from a motion along vertically oriented tracks, the electronic onboard controller is configured to instruct rotation of the pinions several rotations in the pivoting direction of the pivotable-holder until the pinions are situated evenly with the horizontal track, then to stop the rotation and immediately instruct continuous rotation of the pinions in a rotation direction opposite to the first; wherein for motion in first direction along vertically oriented tracks following a turn from a motion along a horizontally oriented track, the electronic onboard controller is configured to instruct continuous rotation of the pinions in the pivoting direction of the pivotable-holder, wherein for motion in a second vertical direction opposite said first vertical direction along vertically oriented tracks following a turn from a motion along a horizontally oriented track, the electronic onboard controller is configured to instruct rotation of the pinions several rotations in the pivoting direction of the pivotable-holder until the axes of each pair of counterpart pinions are situated in the same vertical plane, respectively, then to stop the rotation and immediately instruct continuous rotation of the pinions in a rotation direction opposite to the first.

A third broad aspect of the presently disclosed subject matter is a lift robot.

In one exemplary embodiment the lift robot comprises a bogie according to said third brad aspect, and a crate loader.

A fourth broad aspect of the presently disclosed subject matter is an electronic controller configured to directing a pinion-driven bogie according to said second and third broad aspects, through an array of a plurality of intersecting vertical and horizontal rack-based tracks in which rack segments extend along vertical and horizontal rails and are interrupted and absent in intersection regions thereof, the rack segments are disposed in the rails at least along a bottom end of the horizontal rails and at least on one lateral end of the vertical rails, wherein for heading in a first lateral direction along the horizontally oriented track following a turn from a motion along vertically oriented tracks, the electronic controller is configured to instruct continuous rotation of the pinions in the pivoting direction of the pivotable-holder, wherein for heading in a second lateral direction opposite said first lateral direction along the horizontally oriented track following a turn from a motion along vertically oriented tracks, the electronic controller is configured to instruct rotation of the pinions several rotations in the pivoting direction of the pivotable-holder until the pinions are situated evenly with the horizontal track, then to stop the rotation and immediately instruct continuous rotation of the pinions in a rotation direction opposite to the first; wherein for motion in first direction along vertically oriented tracks following a turn from a motion along a horizontally oriented track, the electronic controller is configured to instruct continuous rotation of the pinions in the pivoting direction of the pivotable-holder, wherein for motion in a second vertical direction opposite said first vertical direction along vertically oriented tracks following a turn from a motion along a horizontally oriented track, the electronic controller is configured to instruct rotation of the pinions several rotations in the pivoting direction of the pivotable-holder until the axes of each pair of counterpart pinions are situated in the same vertical plane, respectively, then to stop the rotation and immediately instruct continuous rotation of the pinions in a rotation direction opposite to the first.

In various embodiments of the lift robot according to the presently disclosed subject matter, the lift robot comprises: a crate loader; and a bogie configured to travel along an array of a plurality of intersecting vertical and horizontal rack-based tracks in which rack segments extend along vertical and horizontal rails and are interrupted and absent in intersection regions thereof, wherein said bogie is configured to travel in a lateral motion mode along the horizontal rails and configured to travel in vertical mode along the vertical rails; wherein said bogie comprising four rotatable holders, wherein each rotatable holder comprises a pair of pinions configured to rotate at a same rotational speed in a first mode, and to rotate at different rotational speeds in a second mode, wherein said bogie is configured to utilize the first mode during the lateral motion mode and during the vertical motion mode, wherein said bogie is configured to utilize the second mode during transition between the lateral motion mode and the vertical motion mode.

In various embodiments of the presently disclosed subject matter, a distance between the pair of pinions in each rotatable holder is greater than the intersection, whereby said boogie is configured to have, at all times when traveling along the array of the plurality of intersecting vertical and horizontal rack-based tracks, at least four pinions engaging the rack-based tracks.

In various embodiments of the presently disclosed subject matter, the boogie is configured to perform a turn in an intersection using a single predetermined corner of the intersection, wherein said boogie is configured to cross the intersection prior to performing the turn to position said boogie in a location to utilize the single predetermined corner.

In various embodiments of the presently disclosed subject matter, the boogie is configured to perform a turn in an intersection using a single predetermined corner of the intersection, wherein said boogie is configured to cross the intersection after performing the turn to continue in a desired direction after utilizing the single predetermined corner.

A fifth broad aspect of the presently disclosed subject matter is a method for turning a pinion-driven lift-robot in an intersection of rails, wherein the pinion-driven lift-robot moves through an array of a plurality of intersecting vertical and horizontal rack-based tracks in which rack segments extend along vertical and horizontal rails and are interrupted and absent in intersection regions thereof, the rack segments are disposed in the rails along one end of the horizontal rails and on one end of the vertical rails, wherein said turning is performed in an absence of racks in a corner of the intersection about which the turn is intended, the method comprises; moving the pinion-driven lift-robot in a first motion mode to position the pinion-driven lift-robot in a first position at the intersection; turning the pinion-driven lift-robot over a second corner of the intersection that is accessible from the first position, wherein the second corner comprises continuous rails connecting a vertical track and a horizontal track, whereby positioning the pinion-driven lift-robot in a second position at the intersection; and moving the pinion-driven lift-robot in a second motion mode towards a designated direction.

In various embodiments of the presently disclosed subject matter, said moving in the first mode comprises crossing the intersection in the first mode.

In various embodiments of the presently disclosed subject matter, said moving in the second mode comprises crossing the intersection in the second mode.

In various embodiments of the presently disclosed subject matter, the first and second modes are selected from a lateral motion mode and a vertical motion mode.

In various embodiments of the presently disclosed subject matter, at least one of said moving in the first mode and said moving in the second mode comprises deducting a movement performing during said turning.

In various embodiments of the presently disclosed subject matter, said deducting comprises moving in a lateral motion in an opposite direction to a lateral advancement made during said turning.

In various embodiments of the presently disclosed subject matter, said deducting comprises moving in a vertical motion in a direction opposite to a vertical advancement made during said turning.

BRIEF DESCRIPTION OF THE FIGURES

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One factor related to the efficiency of a distribution center is the influence of a malfunctioning robot on the routines taken by other robots in the system. For example, it may be of interest that a robot which happen to pause in the middle of a track or in a track-junction may not cause a jam, may minimally interrupt the activities of other robots, and may allow the logistic center to continue its normal activities even before technician intervention. This may depend on the maneuvering capabilities of the other robots in the logistic center when encountering irregularities. It is among the objects of the presently disclosed subject matter to provide robots with relatively flexible maneuvering capabilities, so that the adverse effect on the efficiency of a robot-based system, of a robot pausing is limited.

When the activity level in a logistic center is high, adding robots for carrying-out simultaneous deliveries may result (due to interference between the paths taken by the robots) with an increase in the average time spent for delivering a single crate from one location to another, comparing to the time spent for a similar delivery but without interferences with other deliveries. For the efficiency of the system, such increase in time-spending should be avoided or minimized. It is among the objects of the presently disclosed subject matter to provide robots with flexibility of routing through the system thereby allowing a control center to optimize navigation of the robots through the system in real time.

It is yet another object of the presently disclosed subject matter to minimize the maintenance time of robots in the system, i.e. the average time a robot is out-of-service due to maintenance routines. Among this object is minimizing the wear of robots per a travel distance.

A first solution according to the presently disclosed subject matter is to provide the system with self-propelled robots capable of instantly switching directions from horizontal to vertical and from vertical to horizontal. As can be appreciated, having movability in both the horizontal and the vertical directions combined with the capability of instantly switching the direction of motion from vertical to horizontal and vise-versa, allows a single robot to reach from any location in a shelving system to another. It may further allow a plurality of such single robots to make simultaneous deliveries in a system, with minimal interference (if any) between them. Whenever two robots are about to cross their ways in the system (or to meet when heading in opposite directions along the same path), anyone of them can switch directions in advance, for bypassing the foreseen cross (or meeting) point. In addition, the obstruction created by a pausing robot can be bypassed by detouring around it using other tracks.

In some exemplary embodiments, regardless of the direction of motion of a wheeled robot, the axes of wheels may be oriented horizontally (or closely horizontally). The load vector (resulting from the weight of the robot and of the crate carried by) may thus act on each of the axes of rotation (the axles) of the wheels perpendicularly, thereby avoiding bending moments on the axles and minimizing wear to the wheels, to the axles, and to the wheel bearings (if being used). In various embodiments of the disclosed subject matter, the system comprises arrays of horizontally oriented rails, each rail having a longitudinally-extending load bearing surface configured to allow wheels of the lift robot to rest in perpendicular orientation with their axes oriented horizontally.

In some exemplary embodiments, the same propelling means may provide the robot with both the vertical and the horizontal motion direction capabilities (i.e. the same set of wheels may be used for motion in either direction).

Providing a self-propelled robot with the capability of moving both vertically and horizontally may present a technical challenge. Even more so when the robot is also provided with vertical to horizontal direction switching capability. Making use of the same set of wheels for both horizontal and vertical motions, and with the load vector always acting perpendicularly to the wheel's axis regardless of the direction of motion, increases the challenge furthermore.

Vertical motion of self-propelled robots may require vertically oriented rails, along which the robot can climb and descend. In various embodiments of the disclosed subject matter, the system comprises arrays of vertically oriented rails, each rail having a rack constituting a load bearing means for respective sets of pinion wheels of the robot. The vertically oriented rails thus allow the robots to propel vertically, with the load acting on the wheels' axle perpendicularly.

In the context of the present disclosure the term "track" relates to a pair of parallel rails, wherein each rail in the pair is situated in a separate vertical array of intersecting rails.

According to various embodiments of the presently disclosed subject matter, lift robots may maintain substantial horizontal orientation regardless of their direction of motion. In various embodiments of the invention, for maintaining horizontal orientation during vertical motion, each lift robot may make simultaneous use of two pairs of tracks, i.e. four rails, while one track (two rails) is used during lateral motion.

Allowing the robot to instantly switch direction from vertical to horizontal and from horizontal to vertical may be enabled by providing it with instantly accessible rails in both the horizontal and the vertical directions. This inevitably involves making multiple intersections between the rails constituting the array of vertical rails and the array of horizontal rails.

Intersection between vertical and horizontal rails may involve absence of a piece of rail in either of the required directions, because leaving the rail in the horizontal direction may block the trail in the vertical direction, and vice versa. The absence of a horizontal piece of rail in each intersection between the horizontal rail and a vertical rail, challenges the horizontal motion capability of a robot.

In some exemplary embodiments, the direction-switching capability of the self-propelled robot may be autonomous to the robot, i.e. may not require active rail system.

A first broad aspect of the presently disclosed subject matter relates to a direction switching module for lift robots, the direction switching module comprises a first and a second counterpart roadwheels mounted on a common pivotable-holder (sometimes referred to also as "base") in serial configuration, each roadwheel comprises at least a pinion part (sometimes referred to also "gear wheel") and in various embodiments further comprises a bearing-wheel part. In various embodiments that include bearing wheels, the bearing wheel associated with each pinion shares a common axis with the pinion. The axis of each roadwheel is in parallel orientation to the axis of the counterpart roadwheel. The pivotable-holder comprises a pivoting arrangement, couplable to a bogie of a lift robot and configured to allow the pivotable-holder to pivot about an axis parallel to the axes of the roadwheels between a lateral orientation in which the roadwheels' axes share a horizontal plane and between a vertical orientation in which the roadwheels' axes share a vertical plane. The direction switching module further comprises a motor coupled to the axis of a first of the counterpart wheels for driving the pinion part in a first desired rotation velocity. In various embodiments of the presently disclosed subject matter, the second of the counterpart wheels is either couplable and decouplable from the motor of the first wheel (e.g. by means of electrically operated clutch mechanism). In other various embodiments of the presently disclosed subject matter the second of the counterpart wheels is coupled to a separate motor, having a velocity control terminal separated from a velocity control terminal of the first pinion's motor thereby allowing to determine the velocities of the motors separately.

In the context of the present disclosure the term "velocity control terminal" relates to any electrical connection of a motor, through which its rotation velocity may be controlled. In various embodiments of the presently disclosed subject matter, the main current line of the motor constitutes its velocity control terminal.

Another broad aspect of the presently disclosed subject matter relates to a locomotion unit (hereinafter referred to also as "bogie"), the locomotion unit comprises four sets of wheels, each set comprises a first wheel and a second wheel mounted on a common pivotable-holder in serial configuration, each wheel comprises at least a pinion part (hereinafter referred to also "gear wheel") and in various embodiments a bearing-wheel part parallel to and sharing a common axis with the pinion part, said axis being in parallel orientation to the axis of a counterpart wheel in the set. In some exemplary embodiments, the four sets may be connected to the locomotion unit in parallel pairs (such that the axes of the eight wheels are parallel to one another), each pair comprises two common pivotable-holders in serial configuration.

Another broad aspect of the presently disclosed subject matter relates to a lift robot comprising a bogie according to said second aspect, and a crate loader (referred to also as "puller").

Figure 1A:
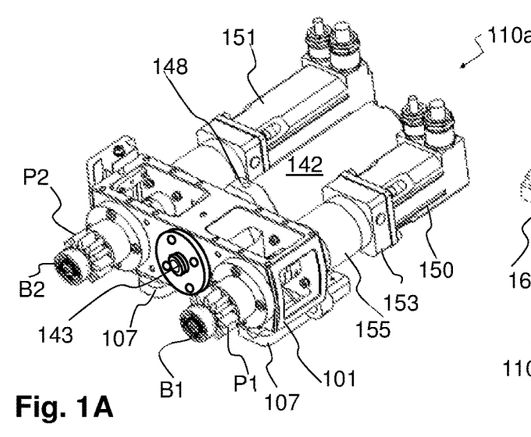
FIG. 1A illustrates in perspective view a direction switching module according to a first embodiment of the presently disclosed subject matter.
Figure 1B:
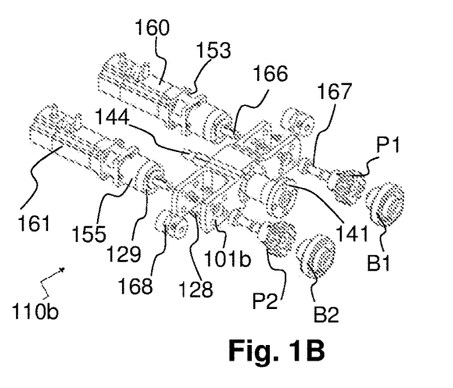
FIG. 1B illustrates a in an exploded perspective view a direction switching module according to a second embodiment of the presently disclosed subject matter.

Referring now to FIGS. 1A and 1B, a direction switching module 110a according to a first embodiment and a direction switching module 110b according to a second embodiment of the presently disclosed subject matter, are presented. The two embodiments differ in a few details as will be further explained but are similar in construction and in their general functionality, thus the exploded view of the module 110b (illustrating the module constituents in a taken apart form) and the mounted view of the module 110a are complementary, mutatis-mutandis.

The modules 110a and 110b comprise each a pair of counterpart pinions P1 and P2 arranged serially (i.e. one travels following its counterpart) with their axles (sometimes referred to a shafts) 167 parallel to one another. Each of the counterpart pinions shares its axle with a respective one of the bearing wheel B1 and B2. While the bearing wheels can freely rotate about the axle, the pinions may be rigidly coupled to a respective driveshaft 166 by respective coupling pieces 168. The drive shafts are driven by respective electrical motors 150 and 151 (160 and 161 in the module embodiment 110b) through gearboxes 155. The pinions may thus rotate clockwise or counterclockwise based on the rotation direction of the motor, and as instructed by the electronic onboard controller (180 FIG. 1C).

The gearboxes are coupled to the motors by respective coupling units 153. The motors are connected to the respective pivotable holder 101 or 101b by screws 128 which pass through respective apertures in the holder and are secured into threaded holes 129 formed in a face plate of the gearbox.

A spline shaft 143 is coupled to the pivotable holder 101 (or 101b) by a flange 141 and bolts. The bolts (not illustrated) are fixed through the holes in the flange into respective threaded apertures formed in the holder. In some exemplary embodiments, the spline shaft may be configured to allow exactly a quarter rotation thereby guaranteeing that the rotatable-holder and the pinions may pivot between a horizontal orientation and a vertical orientation about the frame 100f of the bogie 100 (see for example orientation of modules 101RR and 101RF in FIG. 1G).

Motor 151 includes a brake thus slightly differs in length from motor 150. In various other embodiments of the disclosed subject matter both motors comprise a brake. In some embodiments neither of the two motors comprises inherent brake. In such embodiment braking is provided by breaking arrangement external to the motors.

In various embodiments of the presently disclosed subject matter, including the embodiments illustrated herein, the pivotable holder is configured to allow assembling the module's parts in either a right handedness or in a left handedness configuration. In some exemplary embodiments, the direction switching module may lack mirroring symmetry in term of the module's functionality. For example, having one motor 150 without a brake while the other 151 includes a brake makes the module function asymmetrically. This is because when traveling along a rack in the direction of pinion P2, the heading pinion (P2) is provided with direct braking capability through the brake of motor 151, while when moving in the opposite direction the heading pinion (P1) lacks direct braking means (since motor 151 lacks a brake). The motors can be assembled either as illustrated, or with switching between them such that motor 151 may be coupled to pinion P1. Therefore, pairs of modules having mirroring symmetry may be prepared and fixed on opposite sides of a bogie in any desired configuration. For example, pinions of direction switching modules comoving on parallel rails, may be provided with identical functionality in one bogie configuration, with complementing functionality in another bogie configuration, and with mixed configurations in yet other embodiments.

The pivotable holder 101 has a pivoting arrangement comprising spline shaft 143. The spline shaft 143 is configured to limit the pivoting of the pivotable holder to a quarter turn (90 degrees) between a first position in which the pivotable holder 101 is oriented horizontally (as shown in FIG. 1A) parallel to the bottom of the support plates 107, and a second, in which the pivotable holder 101 is oriented vertically (perpendicularly to the bottom of the support plates 107). A fixator 148 is configured to lock the pivotable holder in one of said two positions, to disable the holder from pivoting when the bogie is in linear motion mode, either lateral or vertical. Referring to FIGS. 1E and 1F, the fixator 148 cooperates with a fixation actuator 149. The fixator 148 is secured to the pivotable holder 101 thus follows the pivoting of the holder between the two extreme positions (horizontal and vertical). The fixator 148 has two fixation arms 148a and 148b angularly spaced with about 90 degrees in between, about the axis of rotation 148x. The fixator 148 is connected to the pivotable holder 101 such that its axis of rotation is in alignment with the axis of pivoting of the holder which is also the pivoting axis of the spline shaft. The stem 144 (see FIG. 1B) of the spline shaft passes through the pentagonal opening 148h of the fixator, and then through a bearing set located inside the beam segment 142, thereby allowing for smooth pivoting of the holder-fixator joint structure about the axis of rotation. The fixation actuator 149 is fixed through actuator holder 149b to the same mounting block which comprises the support plates 107 such that when the pivotable holder is in one of its two extreme positions, a fixation pin 149t of the actuator 149 is in alignment with one of the fixation bores 148i and 148j. When in alignment, the onboard control unit 180 (referred to also herein as 'electronic controller') can actuate the solenoid 149s of the fixation actuator to move the plunger 149p through the guide 149g, thereby bring the fixation pin 149g into a respective one of the bores 148i and 148j (the one with which it is currently aligned). Once locked into the bore, the fixator becomes immovable, and the pivotable holder may remain in a respective extreme orientation (i.e. vertical or horizontal), until released by appropriate control signal from the control unit 180 to the fixation actuator 149.

Once the fixation actuator 149 is withdrawn from the bore 148i or 148j of one of the fixator arms (depending on which of the fixator arms 148b or 148a was aligned with the actuator), the holder 101a becomes unlocked and can freely pivot a quarter rotation until the other fixator arm reaches in front of the fixation actuator 149. It may then become locked again upon actuation signal from the control unit 180 to the actuator solenoid 149s, by moving the fixation pin into the respective bore of the fixator 149.

In various embodiments of the presently disclosed subject matter, the direction switching modules are mounted parallelly (back to back with their splines sharing a common pivoting axis) on a bogie. In various embodiments of the disclosed subject matter, the spline axes about which the rotatable holders are configured to perform quarter rotation, are mutually connected by a main beam. The main beam may comprise a first segment 142 at each of its opposite ends (next to the fixator 148) which together with the support plates 107 of each pivotable holder constitutes a part of a mounting block by which the direction switching module is fixated to the frame 100f of the bogie 100. In various embodiments of the presently disclosed subject matter, a gap in the middle between the beam segments 142 of the back to back direction switching modules (101RF and 101LF, as well as 101RL and 101RR) is bridged by adjustable beam assembly 142a (shown in FIG. 1G).

In some embodiments of the presently disclosed subject matter, the back to back direction switching modules share a single spline shaft. Accordingly, in various embodiments of the disclosed subject matter, the spline shaft 143 may be mounted on the pivotable holder 101a of one of the modules and may be coupled to the pivotable holder 101a of the mirroring module through an adjustable beam assembly thereby making both pivotable holders respond jointly to the state of the single spline shaft.

Figure 1C:
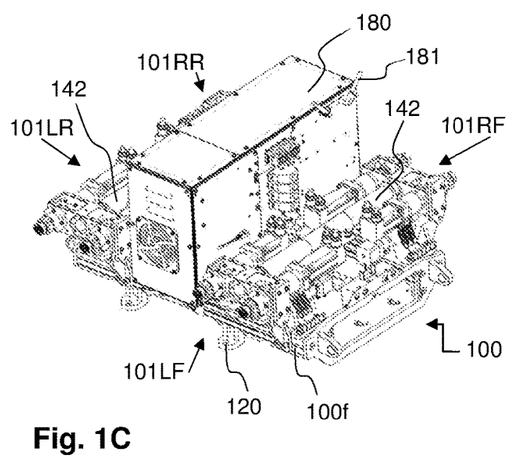
FIG. 1C illustrates a bogie part according to an embodiment of the presently disclosed subject matter, comprising two pairs of the direction switching module shown in FIG. 1A.
Figure 1D:
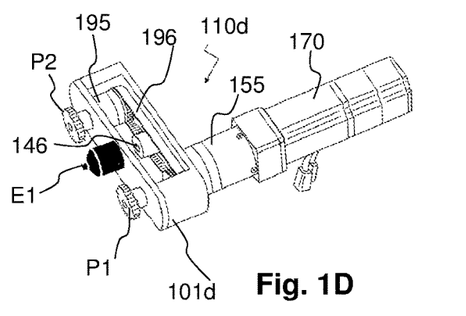
FIG. 1D illustrates in perspective view a direction switching module according to a third embodiment of the presently disclosed subject matter.
Figure 1E:
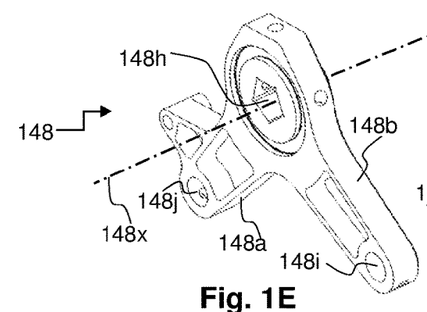
FIG. 1E illustrates an embodiment of a fixator according to the presently disclosed subject matter.
Figure 1F:
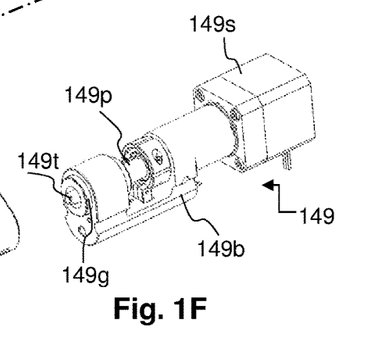
FIG. 1F illustrates an embodiment of a fixation actuator according to the presently disclosed subject matter.
Figures 1G, 1H, 1I:
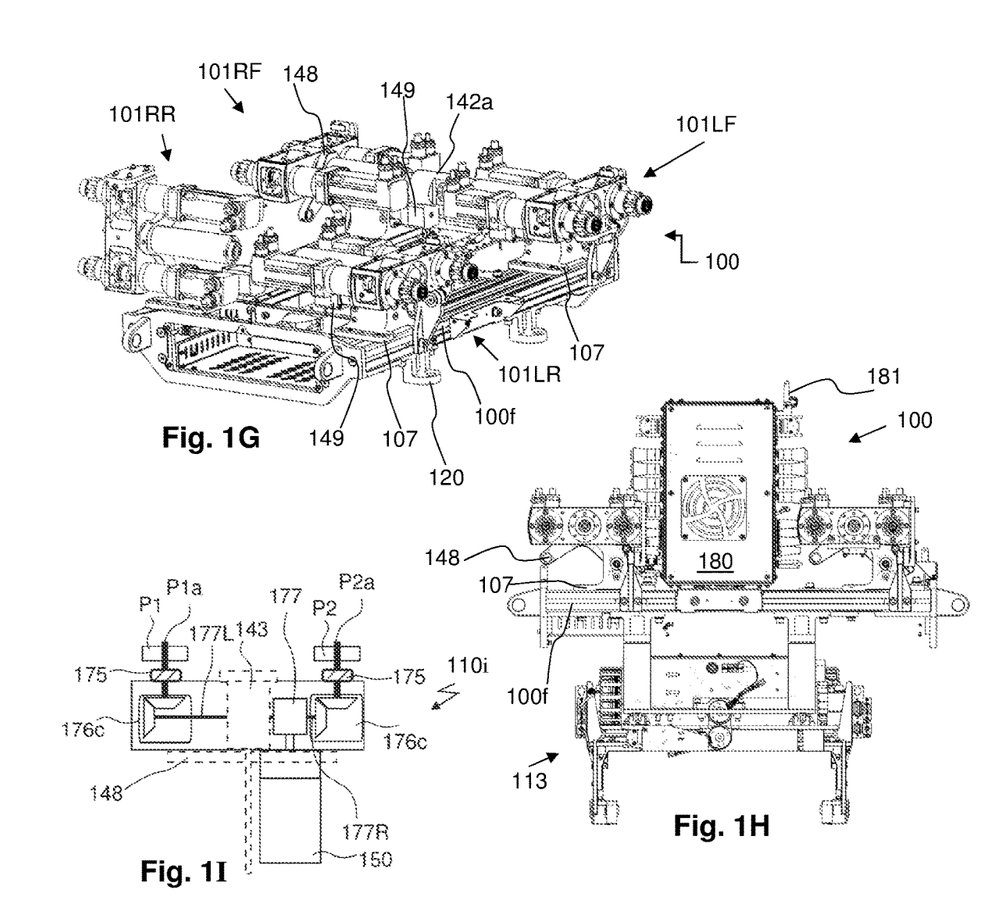
FIG. 1G illustrates the bogie part shown by FIG. 1C from another perspective.
FIG. 1H illustrates a lift robot according to the presently disclosed subject matter.
FIG. 1I illustrates a schematic of a direction switching module according to a fourth embodiment of the presently disclosed subject matter.

FIGS. 1C and 1G illustrate from different perspectives a bogie part of a lift-robot according to an embodiment of the presently disclosed subject matter. The lift robot, including a bogie 100 and a crate loader 113, is illustrated in FIG. 1H. The loader is removably connected to the bogie through brackets 120 and respective bolts (not illustrated).

The bogie 100 comprises two pairs of the direction switching module 110a shown in FIG. 1A. The modules are energized and controlled by the onboard control unit 180. The onboard control unit 180 may be in wireless communication, through antennas 181 and related transceiver electronics, for exchanging logistic data with a central control system of the logistic center. In various embodiments of the disclosed subject matter, the control unit, the motors of the direction switching modules, and any other electrically operated parts thereof, are energized by an onboard rechargeable battery.

In various embodiments, the rechargeable battery is charged directly from electrical voltage supplied to the bogie through the tracks. In various embodiments, the parallel pair of arrays of rails which constitute a track system for the lift robot are electrically isolated from one another. A first pole of an electrical power source may therefore by connected to the one array (or to conductive strips extending along the rails of the respective array and electrically isolated from the rails constituting the array), and the second pole may be connected to the mirroring array of rails. The charging current can then be collected by a bogy of a lift robot through a pair of respective collectors situated from opposite sides of the bogie and configured to contact the conductive strips during operation. A charging session may be initiated and stopped by the control unit based on the real time status of the rechargeable battery.

In various embodiments of the presently disclosed subject matter, the pair of respective collectors situated from opposite sides of the bogie and configured to contact the conductive strips during operation are electrically operable to move between active position in which they contact the conductive strips and a passive position in which they are maintained away from the conductive strip, wherein the onboard control unit is configured to control the collectors to take the active position upon initiation of a charging session and to take the passive position upon termination of the charging session.

In the pair of direction switching modules 101LF and 101RR, the motor with the brake is coupled to the outermost pinion (which becomes atop when the pivotable holder turns vertical). In the pair of direction switching modules 101RF and 101LR the motor with the brake is coupled to the inner pinion (which becomes the lower when the pivotable holder turns vertical). This cross configuration of modules may provide the bogie 100 with at least one heading pinion coupled to a brake in any of the four possible motion directions (up-down and left-right).

FIG. 1D is a perspective view of a direction switching module 110d according to some embodiments of the presently disclosed subject matter. In this embodiment, one motor 170 drives both pinions. The shaft of pinion P1 is coupled directly to the gearbox 155. Pinion P2 is coupled to the shaft of pinion P1 through a transmission belt 196 extending through the pivotable holder 101d and through intermediation of a clutch 195. The clutch 195 is controlled for automatically disengaging the pinion P2 from the motor during direction switching transition-mode, when the rotation velocity of pinion P2 temporally differs from the velocity determined for pinion P1 by the motor 170.

Probe unit E1 is located between the pinions P1 and P2. Probe Unit E1 may be attached to the flange of the spline-shaft (not shown). In various embodiments of the presently disclosed subject matter, the probe unit E1 comprises a spring biased electrode constituting an electricity collector for allowing the bogie to be energized during its traveling on an array of tracks, by collecting electrical current from conductive strips extending along the rails. Collectors facing opposite rails are connected to opposite electrical poles of the bogie's power system, wherein each of the opposite rail arrays is connected to opposite pole of electrical power source, respectively. In various embodiments the spring biased electrode is a carbon brush.

In various embodiments of the presently disclosed subject matter, the probe unit E1 comprises sensing means for location recognition. The sensing means may include barcode scanner, RFID reader and any other desired sensor, for reading and transmitting to the control unit 180 signals associated with real-time location of the bogie 100. Barcode labels or RF tags tagged with their location ID, may be provided in predetermined locations along the rails, thereby allowing the bogie to report its location as a feedback means and for enhancing the accuracy of navigation from one location to another throughout the relevant track infrastructure. In some embodiments the probe comprises a photodetector for identifying the location of the bogie by photo-sensing the absence of rail segments in intersection regions between horizontal and vertical rails and counting the number of rail junctions traversed by the bogie between one location and a current location. In various embodiments photo-sensing is used for counting the number of rack teeth traversed by the bogie between one location and a current location. Additionally or alternatively, the bogie may determine its location by tracking horizontal and vertical offsets from an initial location. A horizontal offset may be determined based on the total rotation of pinions P1 P2 in horizontal motion mode and a vertical offset may be determined based on the total amount of rotation of pinions P1 P2 in vertical motion mode. In some exemplary embodiments, based on the size and distance between the teeth of the pinions, accumulated offset in absolute terms (e.g., 120 cm) may be tracked. In some exemplary embodiments, some adjustments to the horizontal and the vertical offsets may be performed based on the respective horizontal and vertical movements made during transition from horizontal motion mode to vertical motion mode and vice versa.

FIG. 1I illustrates a schematic of a direction switching module 110i according to another embodiment of the presently disclosed subject matter. In this embodiment, the pinions P1 and P2 are coupled to a drive shaft of the motor 150 through a differential gear 177. The rotation axis P1a of pinion P1 is coupled to a left shaft 177L of the differential gear through a left 90 degrees gear transmission 176c, and the rotation axis P2a of pinion P2 is coupled to a right shaft 177R of the differential gear through a right 90 degrees gear transmission 176c. The 90 degrees gear transmissions are configured to make the two pinions P1 and P2 travel serially in the same direction. During a direction switching motion mode, when one of the pinion becomes coupled to a rack perpendicular to the rack to which the other pinion is coupled, the compulsory varying difference between their rotation velocities may automatically materialize due to the intermediation of the differential gear 177.

Each of the pinions may further be coupled to a dedicated brake 175, configured to brake (or decelerate) rotation of its respective pinion whenever idle rotation is recognized. In various embodiments of the presently disclosed subject matter, the controller is configured to alter the velocity of the motor 150 to a desired value other than its value during regular linear motion, until the halted pinion reengages the rail next to the junction.

In various embodiments of the disclosed subject matter, the control unit 180 is configured to monitor the load on the motors of the direction switching modules based on their temporal current consumption, thereby recognizing special events such as idle rotation of a pinion, and responding by braking or decelerating the idle rotation, and/or by altering the velocity of the other pinion.

Figures 2A, 2B, 2C, 2D:
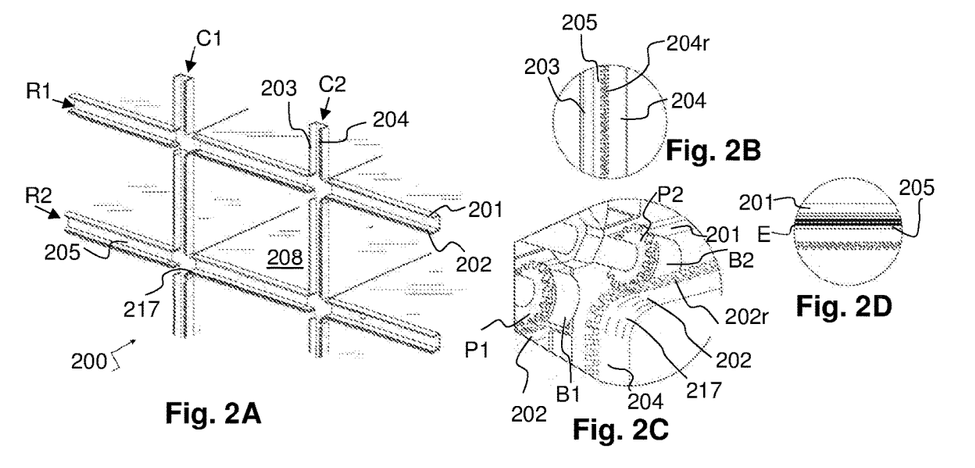
FIG. 2A illustrates in perspective view a typical region within an embodiment of intersecting arrays of vertically and horizontally oriented rails which constitute part of a traveling infrastructure for lift robots according to the presently disclosed subject matter.
FIG. 2B illustrates in an enlarged perspective view a typical rail segment taken from the array of rails illustrated in FIG. 2A.
FIG. 2C illustrates in an enlarged perspective view a typical intersection region (junction) between a vertically oriented rail and a horizontally oriented rail, taken from the array of rails illustrated in FIG. 2A.
FIG. 2D illustrates in an enlarged perspective view a typical rail segment taken from an array of rails having electricity supply line extending along the rails for energizing the lift robots.

FIG. 2A illustrates in perspective view a typical region 200 sectioned from an embodiment of intersecting arrays of vertically and horizontally oriented rails which constitute part of a traveling infrastructure for lift robots according to the presently disclosed subject matter. The sectioned region 200 includes two vertically oriented rails C1 and C2 and two horizontally oriented rails R1 and R2 sectioned from a larger array of rails. The vertically and horizontally oriented rails intersect, thereby allowing a bogie such as illustrated in FIG. 1C to switch its motion direction from vertical to horizontal and vice versa at the intersection regions. An infrastructure of vertical and horizontal tracks through which lift robots can travel is formed by the illustrated array of rails together with a mirroring counterpart array (not shown in the present Fig.) positioned to the left of array region 200R with its rails equidistant from their counterpart rails in array region 200R. Storage spaces 202 are opened to the space between the mirroring rail arrays, and can be accessed by lift robots that use the infrastructure of tracks.

Each rail comprises rack segments configured to be engaged by pinions of the lift robots and to thereby allow the lift robots to travel along the tracks. The horizontal rails comprise rack segments 202r at their bottoms 202 which are bent from a back wall 205 of the rail and protrude horizontally into the space (sometimes referred to also 'loading lane' or 'aisle') through which the lift robots travel. The vertical rails comprise rack segments 204r at their right ends which are bent from a back wall 205 of the rail and protrude vertically into the loading lane. Each rail further comprises bent segments (201 in the horizontal rails and 203 in the vertical rails) protruding from the back walls 205 at an opposite end thereof such that they face the rack containing bent with a predetermined gap in between. In various embodiments of the disclosed subject matter, the gap between the rail segments 202 and 204, and the rail segments 201 and 203, is only between about 0.5% and 3% greater than the diameter of bearing wheels B1 and B2 of a respective direction switching module 101a or 101b. FIG. 2C exemplifies a bearing wheel B1 traveling on rail segment 202 and delimited a small distance from above, by the rail segment 201. The bearing wheels can thus freely move along the gaps in the rail, while traveling, on the bottom bending 202 of the horizontal rails, or on the left bending 204 of the vertical rails, correspondingly to their lateral or vertical motion mode. In the mirroring (left) array of rails which together with the array 200 form the tracks along which the lift robot travels, the vertical rails may have the bending 204 to the right of each rail for a viewer facing the left array from inside the space between the two arrays.

As can be appreciated, the rack segments and the bent segments are absent at the intersection regions between vertical and horizontal rails, and the rails are passive, i.e. the motion of the robots along the tracks and any change of direction from vertical to horizontal and vice versa, is performed autonomously by the robot, as will be explained herein.

FIG. 2B illustrates in an enlarged perspective view a typical rail segment taken from the array of rails illustrated in FIG. 2A. As can be appreciated the wall 203 protrudes from the backwall 205 to a shorter extent than the wall 204, and the rack region 204r is uncovered by the protrusion 203. Accordingly, a pinion rotating about the rack 204r may have a diameter slightly greater than the distance between wall 203 and wall 204 (see for example the pinion P1 in FIG. 2C).

FIG. 2C illustrates in an enlarged perspective view a typical intersection region (junction) between a vertically oriented rail and a horizontally oriented rail, taken from the array of rails illustrated in FIG. 2A. As can be appreciated, in the illustrated embodiment as well as in various embodiments of the presently disclosed subject matter, the corner 217 of an intersection between a vertically oriented rack segment 204 and a horizontally oriented rack segment 202 is curved for smoothening the merger between the horizontal rail and the vertical rail, for thereby allowing more gradual motion between the two rails for a pinion which takes a turn about this corner during a direction switching motion mode.

FIG. 2C further demonstrates how a direction switching module according to the presently disclosed subject matter allows the bogie travel in the intersection region between horizontal and vertical rails, despite the absence of a rail in the direction of motion. Since the rotatable holder is locked by the fixator and thus cannot rotate when entering a junction during linear motion mode, when the frontal pinion enters the junction, the posterior pinion which is still on the rail continues to drive the bogie. The frontal pinion then enters the rail segment next to the junction and already participate in the driving before the posterior pinion enters the junction. In some exemplary embodiments, the distance from pinion P1 (and its associated bearing wheel B1) to pinion P2 (and its associated bearing wheel B2) is greater than the width between the rail segment 202 to the left of the junction and the rail segment 202 to the right of the junction. The rotatable holder thus spans across the junction with pinions P1 on the rail to the left of the junction and with the pinion P2 on the rail to the right of the junction, and as can be appreciated in no situation can both pinions be simultaneously present in the junction.

In various embodiments of the presently disclosed subject matter, the control unit is configured to stop rotation of a pinion which enters a junction during linear motion mode, and to redrive it only one entered the rail segment next to the junction, thereby avoiding or minimizing idle rotation of a motor of the pinion (in embodiments having a dedicated motor per each pinion) and letting the pinion enter the rail smoothly and without damaging the rack by rotational momentum of the engaging pinion. Additionally or alternatively, the pinions may continue to rotate at a same speed as when engaged in the rail segment. In some cases, the rails may continue as if the gap includes rails as well, so as to allow the pinion to enter the rail smoothly when passing the gap, as long as the pinion continues on rotating at the same speed of rotation when engaged.

FIG. 2D illustrates in an enlarged perspective view a typical rail segment taken from an array of rails having electricity supply strip E extending along the rails for energizing the lift robots. In the present embodiment the strip E is attached to the backwall 205 of the rail. In various embodiments of the disclosed subject matter the strip E is electrically isolated from the rail wall 205 (e.g. by a plastic strip located between the metallic rail wall 205 and the conductive strip E). Electrical current may be supplied from the conductive strip E to a power input of the onboard control unit 180, through a collector such as E1 of FIG. 1D.

Figures 3A, 3B, 3C, 3D, 3E:
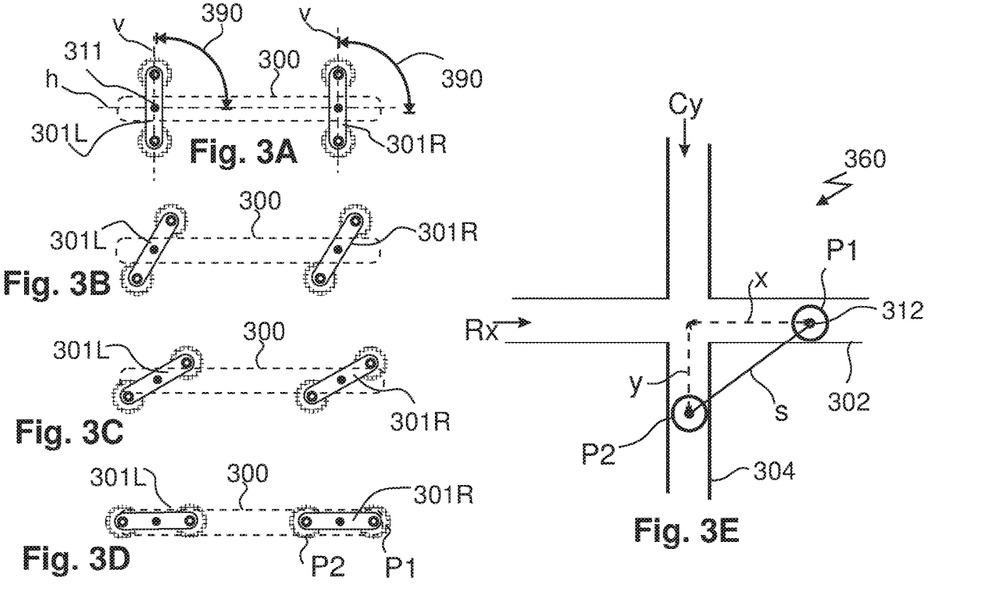
FIG. 3A illustrates general schematic view resembling the orientation of a pair of rotatable holders of direction switching modules of a lift robot bogie according to the presently disclosed subject matter during vertical motion mode.
FIG. 3B illustrates general schematic view resembling the temporal orientation the rotatable holders of FIG. 3A during a first stage of transitioning from vertical to lateral motion mode (which is like their orientation during the last stages of transitioning from lateral to vertical motion mode).
FIG. 3C illustrates general schematic view resembling the temporal orientation the rotatable holders of FIG. 3A during a last stage of transitioning from lateral to vertical motion mode (which is like their orientation during the first stages of transitioning from vertical to lateral motion mode).
FIG. 3D illustrates the orientation of the rotatable holders of FIG. 3A during lateral motion mode.
FIG. 3E is a trigonometric outline for facilitating the explanation of how the rotation velocities of counterpart pinions of a rotatable holders according to the presently disclosed subject matter vary during direction changing transition-mode.
Figure 4A:
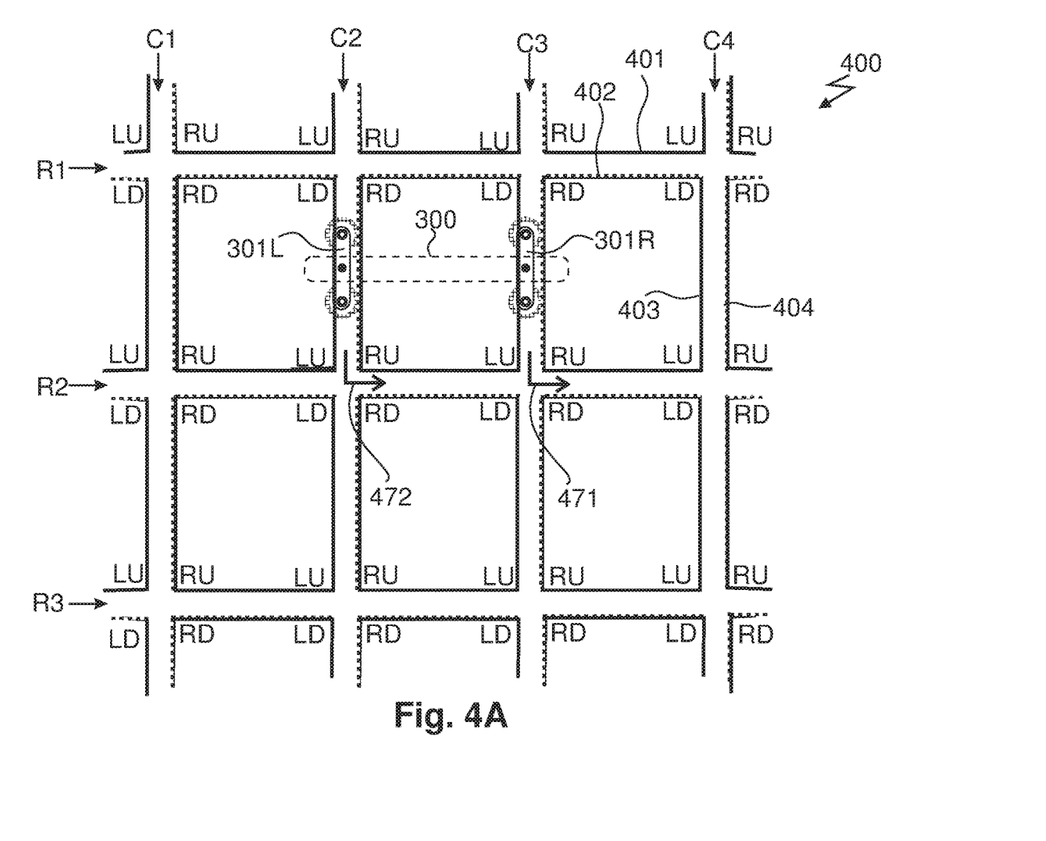
FIG. 4A illustrates general schematic view resembling a front view of intersecting arrays of vertically and horizontally oriented rails which constitute part of a traveling infrastructure for lift robots according to the presently disclosed subject matter, with a pair of rotatable holders situated in a pair of vertical rails.

FIG. 3A illustrates general schematic view resembling the orientation of a pair of rotatable holders 301L and 301R of rotatable holders of a lift robot bogie 300 according to the presently disclosed subject matter, during vertical motion mode. In FIG. 4A said temporal orientation is demonstrated with the bogie 300 situated on an array 400 comprising a plurality of vertical and horizontal intersecting rails. The array 400, corresponding to the array 400R of FIG. 4E, is a righthand part which together with a mirroring left-hand part such as 400L of FIG. 4E, constitutes a traveling infrastructure for lift robots according to the presently disclosed subject matter. The pinions of the pair of the rotatable holders 301L and 301R are situated in a pair of neighboring vertical rails C2 and C3, in a height between horizontal rails R1 and R2. From this position, the lift robot can use the traveling infrastructure for traveling to any other position in the array 400 to be instructed by a central control system of the logistic center through the onboard control unit 180.

Suppose the lift robot is heading down intending to switch from its vertical motion mode along rails C2 and C3 to a lateral motion mode through row R2 as indicated by bent arrows 472 and 471. The controller 180 will then operate the motors of the respective direction switching modules to move the bogie across the junctions and bring the bogie to a halt in the position illustrated by FIG. 4B, with the upper pinion of each of the rotatable holders 300L and 300R in a respective intersection region between the horizontal rail R1 and the vertical rails C2 and C3. The rail corners which define a junction formed by the intersection are annotated LU and RU for the left upper and the right upper corners, and LD and RD for the left lower and right lower corners. In the illustrated embodiment rack segments 404 are present only on the right side of the vertical rails, therefore a merger between vertical and horizontal rack segments is present only at the right lower corner RD of each junction between vertical and horizontal rails. Correspondingly, the spline shafts are configured to allow for quarter rotation of the pivotable holders 301L and 301R only about RD junction corners. This provides, however, the lift robot with unlimited direction switching capabilities from vertical to horizontal motion modes through any junction as will be further explained herein. The corners RD may be curved as shown in FIGS. 2A and 2C for smoothening the merger between the related vertical and horizontal rail segments. However, the disclosed subject matter is not limited to such embodiment, and the corners LD may be curved instead of the RD corners. It is noted that the curved corner may be on a bottom side of the junction so as to enable movement downwards when transitioning from a lateral motion to vertical motion, so as to avoid moving against gravitational forces.

FIG. 3B illustrates general schematic view resembling the temporal orientation the rotatable holders 301L and 301R during a first stage of transitioning from vertical to lateral motion mode. This temporal position is typical also to their temporal orientation during the last stages of transitioning from lateral to vertical motion mode. While the motions of the bogie 300 are explained herein with the bogie heading in directions defined in the texts and indicated by respective arrows (such as arrows 471 and 472 of FIG. 4A), it is noted that the bogie can return through the same route, heading in directions opposite to the first while maneuvering through the tracks as if reversing in time, respective to its maneuvering during motion in the first directions.

Figure 4B:
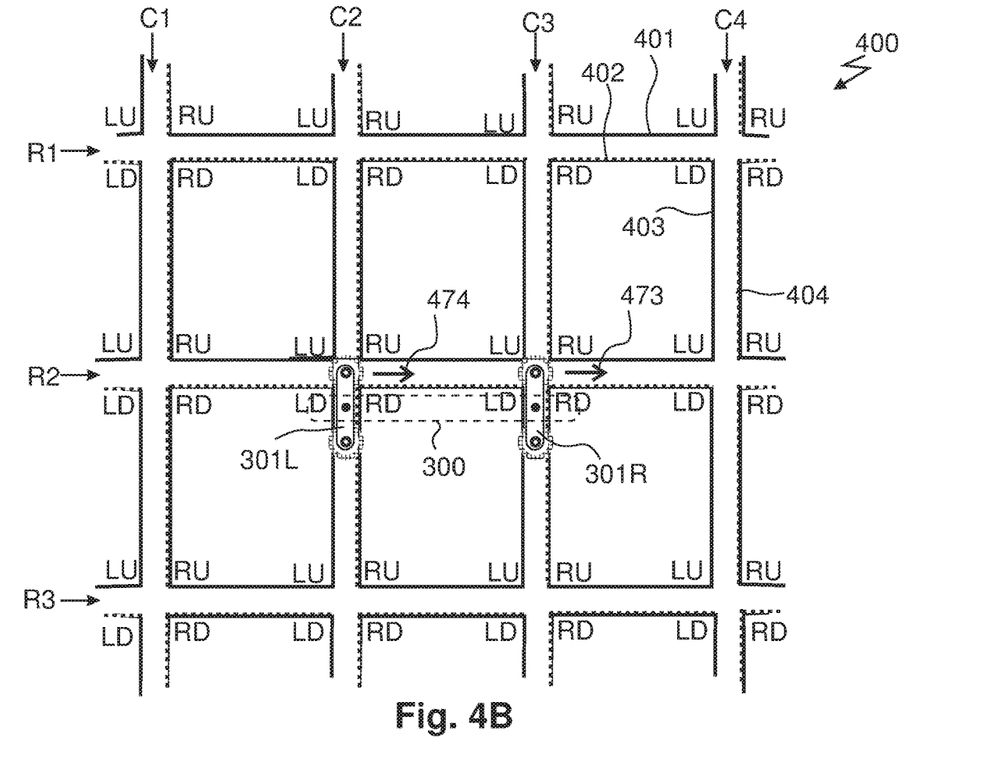
FIG. 4B illustrates the general schematic view of FIG. 4A with the pair of rotatable holders situated in the vertical rails in position which allows both, immediate vertical motion and transitioning to lateral motion.

When the bogie is in the position illustrated by FIG. 4B, the controller can instruct the fixation actuator to unlock the pivotable holders 301L and 301R from their vertical orientation, thereby freeing them to make a quarter turn about the right lower corner RD. In various embodiments of the disclosed subject matter, the pivotable holders are spring biased clockwise for guaranteeing their turn about the corner RD when moving upwardly with the spline shaft unlocked. When making the turn in the opposite direction (i.e. when in lateral motion to the left through a horizontal rail and unlocking the pivotable-holder for switching to a vertical motion mode) the weight of the direction switching module left to the spline, may bias the rotatable holder counterclockwise against the spring, thereby letting the left pinion follow the corner RD down into the respective vertical rail.

Figure 4C:
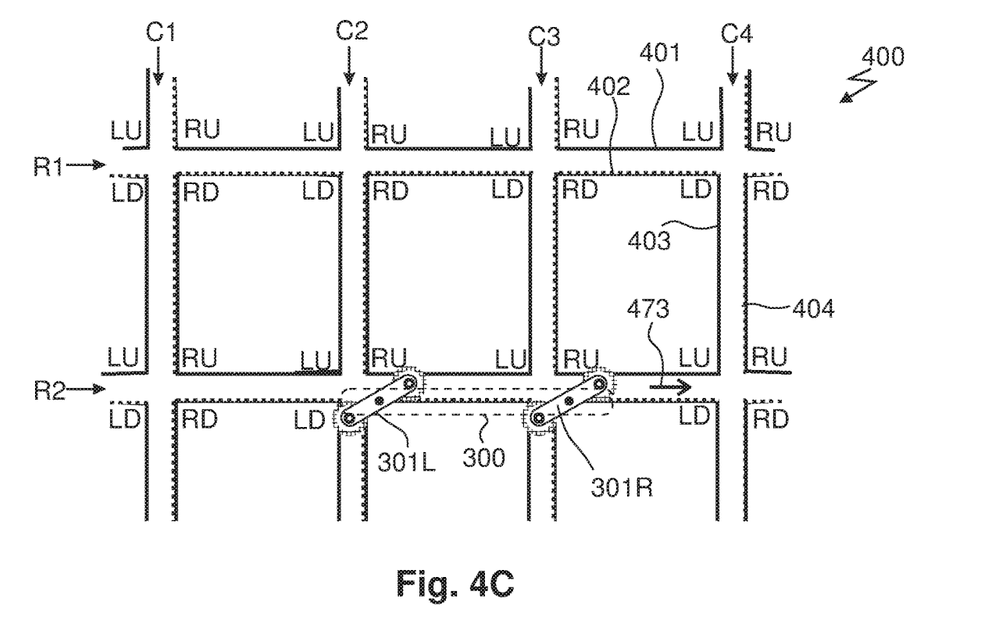
FIG. 4C illustrates the general schematic view of FIG. 4A with the pair of rotatable holders situated one pinion of each module in a vertical rail and its counterpart in a horizontal rail, resembling a temporal position during direction switching transition-mode.

Once the controller instructs the motors to rotate the pinions clockwise from the position illustrated by FIG. 4B, and having the pivotable-holders unlocked, the pivotable-holders may pivot clockwise towards taking the orientation illustrated by FIG. 3B, and further towards taking the position illustrated by FIG. 3C, with the bogie situated in the traveling array 400 as illustrated by FIG. 4C.

FIG. 3C illustrates general schematic view resembling the temporal orientation the rotatable holders 300L and 300R during a last stage of transitioning from lateral to vertical motion mode (which is like their orientation during the first stages of transitioning from vertical to lateral motion mode).

In FIG. 4C one pinion of each direction switching module is positioned in a vertical rail and its counterpart in a horizontal rail, resembling a one of the temporal positions taken by the pivotable holders and the related pinions during direction switching transition-mode.

Figure 4D:
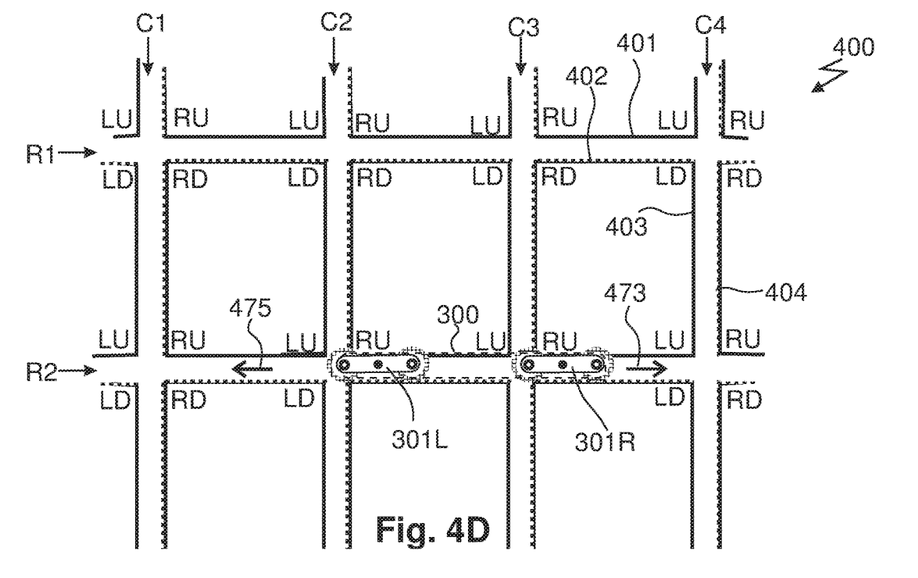
FIG. 4D illustrates the general schematic view of FIG. 4A with the pinions of the rotatable holders situated in a horizontal rail in position which allows both, immediate lateral motion and transitioning to vertical motion.
Figure 4E:
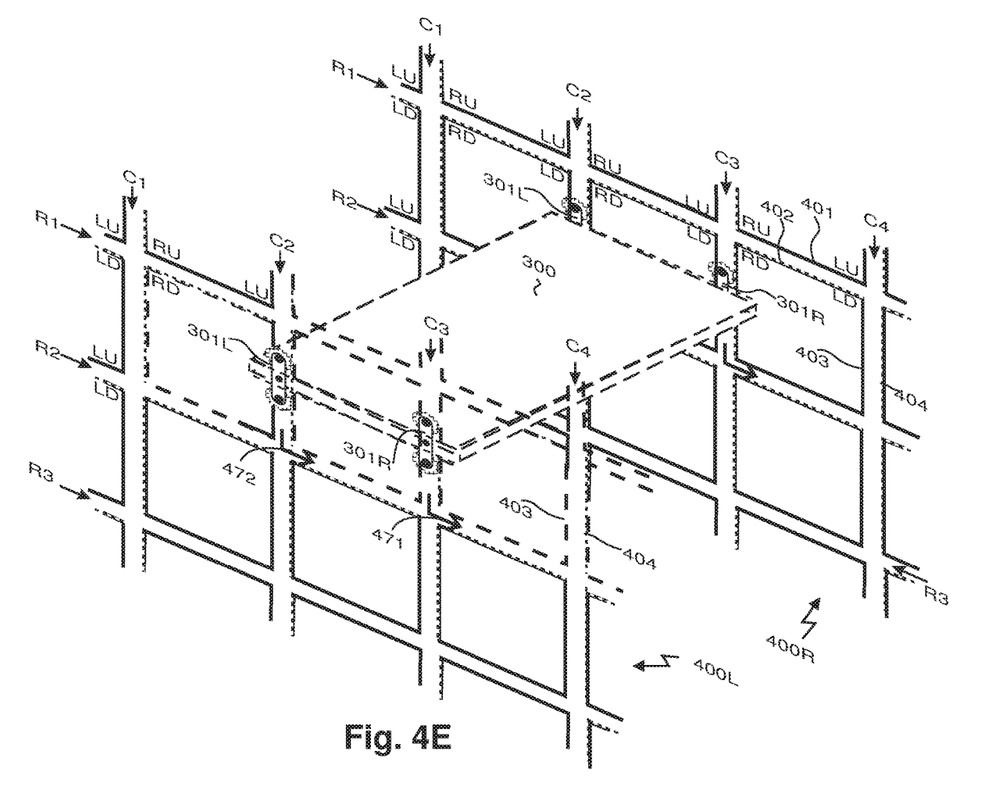
FIG. 4E illustrates the schematic view of FIG. 4A in perspective showing a pair of arrays of rails constituting a network of tracks, with two pairs of rotatable holders of the bogie, the pinions of one pair situated in a pair of vertical rails of a right-side array of rails, and the pinions of a second, mirroring pair, situated in a pair of vertical rails of a left-side array of rails.

Finally, with the pinions continue with their clockwise rotation, the rotatable holders 300L and 300R will take the horizontal orientation illustrated by FIGS. 3D and 4D, allowing the fixation-actuator to relock into a lateral motion mode. Once the fixation-actuator 149 locks the rotatable holder horizontally, the lateral motion to the right as indicated by arrows 473 474 may be continued to the entire extent of the rail R2. In case the rail is occupied by another lift robot, the bogie may be instructed (by the central control system that manages the traffic of robots in the logistic center) to bypass the occupied rail segment through a parallel horizontal rail, which can be reached through vertical rail due to the direction switching capabilities which the direction switching module provides.

In case switching from the vertical motion along rails C2 and C3 into lateral motion mode through rail R2 is intended for moving through rail R2 to the left as indicated by arrow 475, the controller 180 will halt the bogie 300 in the position illustrated by FIG. 4D and will operate the motors to rotate the pinions counterclockwise. Motion in the direction indicated by arrow 475 may continue to the entire extent of the rail, as long as the rotatable holders are kept locked horizontally.

The maneuvering of the rotatable holders about the right lower corners RD, thus allow the bogie 300 to use any junction between vertical and horizontal rails for switching from lateral motion either to the right or to the left, to vertical motion either up or down, and vice versa.

FIG. 3E is a trigonometric outline for facilitating the explanation of how the rotation velocities of counterpart pinions P1 and P2 of a direction switching module according to the presently disclosed subject matter vary during direction changing transition-mode. Calculation of the ratio between the temporal velocity of pinion P2 and the temporal velocity P1 is highly important in embodiments which use separate motor for each pinion. In such embodiments of the disclosed subject matter the control unit adapts the temporal velocities of the two motors e.g. by maintaining the velocity of one motor unchanged while varying the velocity of other motor for keeping a match with the trigonometrically calculated ratio between the velocities.

The temporal velocity of pinion P1 along the extent of the dashed line x is dx/dt, the temporal velocity of pinion P1 along the extent of the dashed line y is dy/dt, hence the ratio between the velocities is equal to dy/dx, which is the derivative of y with respect to x. since y is equal to the square root of the difference between the square of the separation between the axes of the wheels (represented by the line s in the figure) and the square of x, it follows that the derivative of y with respect to x is the inverse of the ratio x/y. So, the ratio between the temporal velocity of pinion P2 along the vertical rail Cy and the temporal velocity of the pinion P1 along the horizontal rail Rx is inversely proportional to the ratio between (i) the separation between the axis of rotation of pinion P1 and a vertical plane in which the axis of rotation of pinion P2 is situated, and (ii) separation between the axis of rotation of pinion P2 and a horizontal plane in which the axis of rotation of pinion P1 is situated.

Since the distance between the axes of rotation of the pinions is a known and unchanged factor, the onboard control unit can calculate in real time and accordingly control the rotation and vary the velocity of a motor of one of the pinions, based on a known fixed velocity of the other pinion and/or based on the known temporal separation of either of the pinions from the corner about which they make a turn.

FIG. 4E illustrates the schematic view of FIG. 4A in perspective showing a pair of arrays of rails 400R (corresponding to array 400 in FIG. 4A) and 400L, which together constitute a network of tracks. A bogie 300 having two pairs of rotatable holders 301L and 301R is shown, with one pair of holders situated in a pair of vertical rails C2 and C3 of a right-side array of rails 400R, and a second, mirroring pair of holders, situated in a pair of vertical rails C2 and C3 of a left-side array of rails 400L.

In some exemplary embodiments, the boogie 300 may be capable of utilizing a single continuous track in a junction (located at corner RD, in the illustrated embodiments) to change from lateral to vertical motion and vice versa. In some exemplary embodiments, in order to continue to a desired direction, the boogie 300 may be required to pass the junction before making the transition in its motion type. Additionally or alternatively, the boogie 300 may be required to pass the junction after making the transition in its motion type. In some exemplary embodiments, such as in case the boogie 300 shown in FIG. 4A is to move in the direction indicated by arrow 475 in FIG. 4D, the boogie may cross the junction in vertical mode (4B), switch to lateral mode (4C), and cross the junction once again.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A direction switching module for lift robots, the direction switching module comprises:
   a first and a second counterpart pinions mounted in serial configuration on a common pivotable-holder, the pinions are couplable to an external rack for traveling along the rack upon rotation of the pinions, wherein an axis of rotation of the first pinion is in parallel orientation to an axis of rotation of the counterpart pinion, the pivotable-holder comprises a pivoting arrangement in a mid-portion thereof and is couplable to a bogie of a lift robot such that the pivotable-holder can pivot about an axis parallel to the axes of the pinions, between a lateral orientation in which the pinions' axes share a horizontal plane and between a vertical orientation in which the pinions' axes share a vertical plane; and
   a motor, wherein a drive-shaft of the motor is coupled to the axis of a first of the counterpart pinions for driving the pinion in a desired rotation velocity, wherein the second of the counterpart pinions is coupled to a driving mechanism configured to drive the counterpart pinion in a velocity equal to that of the first when both pinions are coupled to a linear rack, and varying with respect of the first when the pinions are coupled one to a vertically oriented rack and the other to a horizontally oriented track, wherein the axis of the second pinion is couplable and decouplable from the motor in response to a controlling signal.

2. The direction switching module for lift robots according to claim 1, wherein the rotation axis of the second of the pinions is coupled to the motor through a clutch.

3. The direction switching module for lift robots according to claim 2, wherein the clutch is coupled to the drive-shaft by means of a transmission belt.

4. The direction switching module for lift robots according to claim 2, wherein at least one of the motor and the clutch comprises an electrically controllable brake configured to prevent rotation of at least one of the counterpart pinions upon receiving a brake signal from a controller of the lift robot.

5. A direction switching module for lift robots, the direction switching module comprises:
   a first and a second counterpart pinions mounted in serial configuration on a common pivotable-holder, the pinions are couplable to an external rack for traveling along the rack upon rotation of the pinions, wherein an axis of rotation of the first pinion is in parallel orientation to an axis of rotation of the counterpart pinion, the pivotable-holder comprises a pivoting arrangement in a mid-portion thereof and is couplable to a bogie of a lift robot such that the pivotable-holder can pivot about an axis parallel to the axes of the pinions, between a lateral orientation in which the pinions' axes share a horizontal plane and between a vertical orientation in which the pinions' axes share a vertical plane; and
   a motor, wherein a drive-shaft of the motor is coupled to the axis of a first of the counterpart pinions for driving the pinion in a desired rotation velocity, wherein the second of the counterpart pinions is coupled to a driving mechanism configured to drive the counterpart pinion in a velocity equal to that of the first when both pinions are coupled to a linear rack, and varying with respect of the first when the pinions are coupled one to a vertically oriented rack and the other to a horizontally oriented track, wherein the axis of the second pinion is coupled to a separate motor having a velocity control terminal separated from a velocity control terminal of the first pinion's motor thereby allowing to determine the velocities of the motors separately.

6. The direction switching module for lift robots according to claim 5, wherein the separate motor is coupled to or having a brake mechanism configured to prevent rotation of the second of the counterpart pinions upon receiving a brake signal from a controller of the lift-robot.

7. The direction switching module for lift robots according to claim 5, controllably connected to a controller of the robot, wherein the controller is configured to dynamically determine a ratio of rotation velocities between the velocity of the motor coupled to the first of the counterpart pinions and the velocity of the separate motor, wherein the ratio of rotation velocities is inversely proportional to the ratio between (i) the distance of the axis of rotation of the first of the counterpart pinions from a vertical plane in which the axis of rotation of the second of the counterpart pinions is situated, and (ii) the distance of the axis of rotation of the second of the counterpart pinions from a horizontal plane in which the axis of rotation of the first of the counterpart pinions is situated.

8. A direction switching module for lift robots, the direction switching module comprises:
   a first and a second counterpart pinions mounted in serial configuration on a common pivotable-holder, the pinions are couplable to an external rack for traveling along the rack upon rotation of the pinions, wherein an axis of rotation of the first pinion is in parallel orientation to an axis of rotation of the counterpart pinion, the pivotable-holder comprises a pivoting arrangement in a mid-portion thereof and is couplable to a bogie of a lift robot such that the pivotable-holder can pivot about an axis parallel to the axes of the pinions, between a lateral orientation in which the pinions' axes share a horizontal plane and between a vertical orientation in which the pinions' axes share a vertical plane; and
   a motor, wherein a drive-shaft of the motor is coupled to the axis of a first of the counterpart pinions for driving the pinion in a desired rotation velocity, wherein the second of the counterpart pinions is coupled to a driving mechanism configured to drive the counterpart pinion in a velocity equal to that of the first when both pinions are coupled to a linear rack, and varying with respect of the first when the pinions are coupled one to a vertically oriented rack and the other to a horizontally oriented track, wherein the axis of the second pinion is coupled through a first axis of a differential gear to the drive shaft of the motor to which the first of the counterpart pinions is coupled through a second axis of the differential gear, such that when one pinion happens to rotate faster than the drive-shaft the other pinion rotates respectively slower than the drive shaft, wherein each of the pinions has a dedicated brake configured to prevent idle rotation of the pinion.

9. The direction switching module for lift robots according to claim 8, wherein the dedicated brake comprises an actuation lever the actuation lever is configured to release the brake and let the respective pinion rotate upon rotation of the drive shaft when the pinion is coupled to the rack and to brake the pinion upon disengagement from the rack.

10. A direction switching module for lift robots the direction switching module comprises:
   a first and a second counterpart pinions mounted in serial configuration on a common pivotable-holder, the pinions are couplable to an external rack for traveling along the rack upon rotation of the pinions, wherein an axis of rotation of the first pinion is in parallel orientation to an axis of rotation of the counterpart pinion, the pivotable-holder comprises a pivoting arrangement in a mid-portion thereof and is couplable to a bogie of a lift robot such that the pivotable-holder can pivot about an axis parallel to the axes of the pinions, between a lateral orientation in which the pinions' axes share a horizontal plane and between a vertical orientation in which the pinions' axes share a vertical plane;
   a motor, wherein a drive-shaft of the motor is coupled to the axis of a first of the counterpart pinions for driving the pinion in a desired rotation velocity, wherein the second of the counterpart pinions is coupled to a driving mechanism configured to drive the counterpart pinion in a velocity equal to that of the first when both pinions are coupled to a linear rack, and varying with respect of the first when the pinions are coupled one to a vertically oriented rack and the other to a horizontally oriented track; and
   an electrical collector configured to contact an external current supply strip extending parallel to the rack.

11. A bogie comprising two pairs of a direction switching module,
wherein each direction switching module comprises:
   a first and a second counterpart pinions mounted in serial configuration on a common pivotable-holder, the pinions are couplable to an external rack for traveling along the rack upon rotation of the pinions, wherein an axis of rotation of the first pinion is in parallel orientation to an axis of rotation of the counterpart pinion, the pivotable-holder comprises a pivoting arrangement in a mid-portion thereof and is couplable to a bogie of a lift robot such that the pivotable-holder can pivot about an axis parallel to the axes of the pinions, between a lateral orientation in which the pinions' axes share a horizontal plane and between a vertical orientation in which the pinions' axes share a vertical plane; and
   a motor, wherein a drive-shaft of the motor is coupled to the axis of a first of the counterpart pinions for driving the pinion in a desired rotation velocity, wherein the second of the counterpart pinions is coupled to a driving mechanism configured to drive the counterpart pinion in a velocity equal to that of the first when both pinions are coupled to a linear rack, and varying with respect of the first when the pinions are coupled one to a vertically oriented rack and the other to a horizontally oriented track;

wherein each direction switching module is configured to communicate with an electronic controller for comoving with the others, thereby making the bogie capable of traveling in any desired one of three motion modes without changing the spatial orientation of the bogie, including (i) moving laterally along a horizontally oriented two-rails track; (ii) moving vertically along a pair of vertically oriented two-rails tracks; (iii) moving curvedly while simultaneously utilizing said horizontally oriented track and said vertically oriented pair of tracks; wherein a ratio between simultaneous rotation velocities of a pinion situated in a horizontally oriented rail and of a counterpart pinion situated in a vertically oriented rail is inversely proportional to the ratio between the respective separations between the axes of rotation of the counterpart pinions and the intersection between the vertical and the horizontal planes in which the axes are situated.

12. The bogie according to claim 11, further comprising common electronic onboard controller wirelessly communicable with a remote computer.

13. The bogie according to claim 12 wherein the pivotable-holders of the direction switching units are configured to pivot in one of clockwise and counterclockwise directions for turning from a motion along vertically oriented tracks to a motion along a horizontally oriented track, and to pivot in a direction opposite to the first for turning from a motion along a horizontally oriented track, to a motion along vertically oriented tracks, wherein for heading in a first lateral direction along the horizontally oriented track following a turn from a motion along vertically oriented tracks, the electronic onboard controller is configured to instruct continuous rotation of the pinions in the pivoting direction of the pivotable-holder, wherein for heading in a second lateral direction opposite said first lateral direction along the horizontally oriented track following a turn from a motion along vertically oriented tracks, the electronic onboard controller is configured to instruct rotation of the pinions several rotations in the pivoting direction of the pivotable-holder until the pinions are situated evenly with the horizontal track, then to stop the rotation and immediately instruct continuous rotation of the pinions in a rotation direction opposite to the first; wherein for motion in first direction along vertically oriented tracks following a turn from a motion along a horizontally oriented track, the electronic onboard controller is configured to instruct continuous rotation of the pinions in the pivoting direction of the pivotable-holder, wherein for motion in a second vertical direction opposite said first vertical direction along vertically oriented tracks following a turn from a motion along a horizontally oriented track, the electronic onboard controller is configured to instruct rotation of the pinions several rotations in the pivoting direction of the pivotable-holder until the axes of each pair of counterpart pinions are situated in the same vertical plane, respectively, then to stop the rotation and immediately instruct continuous rotation of the pinions in a rotation direction opposite to the first.

14. An electronic controller configured to directing a pinion-driven bogie, through an array of a plurality of intersecting vertical and horizontal rack-based tracks in which rack segments extend along vertical and horizontal rails and are interrupted and absent in intersection regions thereof,
   the rack segments are disposed in the rails at least along a bottom end of the horizontal rails and at least on one lateral end of the vertical rails, wherein the pinion-driven bogie comprises two pairs of the direction switching module, wherein each direction switching module comprises:
- a first and a second counterpart pinions mounted in serial configuration on a common pivotable-holder, the pinions are couplable to an external rack for traveling along the rack upon rotation of the pinions, wherein an axis of rotation of the first pinion in in parallel orientation to an axis of rotation of the counterpart pinion, the pivotable-holder comprises a pivoting arrangement in a mid-portion thereof and is couplable to a bogie of a lift robot such that the pivotable-holder can pivot about an axis parallel to the axes of the pinions, between a lateral orientation in which the pinions' axes share a horizontal plane and between a vertical orientation in which the pinions' axes share a vertical plane; and
- a motor, wherein a drive-shaft of the motor is coupled to the axis of a first of the counterpart pinions for driving the pinion in a desired rotation velocity, wherein the second of the counterpart pinions is coupled to a driving mechanism configured to drive the counterpart pinion in a velocity equal to that of the first when both pinions are coupled to a linear rack, and varying with respect of the first when the pinions are coupled one to a vertically oriented rack and the other to a horizontally oriented track;

wherein each direction switching module is configured to communicate with an electronic controller for comoving with the others, thereby making the bogie capable of traveling in any desired one of three motion modes without changing the spatial orientation of the bogie, including (i) moving laterally along a horizontally oriented two-rails track; (ii) moving vertically along a pair of vertically oriented two-rails tracks; (iii) moving curvedly while simultaneously utilizing said horizontally oriented track and said vertically oriented pair of tracks; wherein a ratio between simultaneous rotation velocities of a pinion situated in a horizontally oriented rail and of a counterpart pinion situated in a vertically oriented rail is inversely proportional to the ratio between the respective separations between the axes of rotation of the counterpart pinions and the intersection between the vertical and the horizontal planes in which the axes are situated;

wherein for heading in a first lateral direction along the horizontally oriented track following a turn from a motion along vertically oriented tracks, the electronic controller is configured to instruct continuous rotation of the pinions in the pivoting direction of the pivotable-holder, wherein for heading in a second lateral direction opposite said first lateral direction along the horizontally oriented track following a turn from a motion along vertically oriented tracks, the electronic controller is configured to instruct rotation of the pinions several rotations in the pivoting direction of the pivotable-holder until the pinions are situated evenly with the horizontal track, then to stop the rotation and immediately instruct continuous rotation of the pinions in a rotation direction opposite to the first; wherein for motion in first direction along vertically oriented tracks following a turn from a motion along a horizontally oriented track, the electronic controller is configured to instruct continuous rotation of the pinions in the pivoting direction of the pivotable-holder, wherein for motion in a second vertical direction opposite said first vertical direction along vertically oriented tracks following a turn from a motion along a horizontally oriented track, the electronic controller is configured to instruct rotation of the pinions several rotations in the pivoting direction of the pivotable-holder until the axes of each pair of counterpart pinions are situated in the same vertical plane, respectively, then to stop the rotation and immediately instruct continuous rotation of the pinions in a rotation direction opposite to the first.

15. A lift robot comprising:
a crate loader;
a bogie configured to travel along an array of a plurality of intersecting vertical and horizontal rack-based tracks in which rack segments extend along vertical and horizontal rails and are interrupted and absent in intersection regions thereof, wherein said bogie is configured to travel in a lateral motion mode along the horizontal rails and configured to travel in vertical mode along the vertical rails;
wherein said bogie comprising four rotatable holders, wherein each rotatable holder comprises a pair of pinions that are mounted in serial configuration thereon, said pair of pinions are configured to rotate at a same rotational speed in a first mode, and to rotate at different rotational speeds in a second mode, wherein said bogie is configured to utilize the first mode during the lateral motion mode and during the vertical motion mode, wherein said bogie is configured to utilize the second mode during transition between the lateral motion mode and the vertical motion mode; and
a motor, wherein a drive-shaft of the motor is configured to cause at least a portion of said four rotatable holders;
wherein a distance between the pair of pinions in each rotatable holder is greater than the intersection, whereby said boogie is configured to have, at all times when traveling along the array of the plurality of intersecting vertical and horizontal rack-based tracks, at least four pinions engaging the rack-based tracks.

16. A lift robot comprising:
a crate loader;
a bogie configured to travel along an array of a plurality of intersecting vertical and horizontal rack-based tracks in which rack segments extend along vertical and horizontal rails and are interrupted and absent in intersection regions thereof, wherein said bogie is configured to travel in a lateral motion mode along the horizontal rails and configured to travel in vertical mode along the vertical rails;
wherein said bogie comprising four rotatable holders, wherein each rotatable holder comprises a pair of pinions that are mounted in serial configuration thereon, said pair of pinions are configured to rotate at a same rotational speed in a first mode, and to rotate at different rotational speeds in a second mode, wherein said bogie is configured to utilize the first mode during the lateral motion mode and during the vertical motion mode, wherein said bogie is configured to utilize the second mode during transition between the lateral motion mode and the vertical motion mode; and
a motor, wherein a drive-shaft of the motor is configured to cause at least a portion of said four rotatable holders;
wherein said boogie is configured to perform a turn in an intersection using a single predetermined corner of the intersection, wherein said boogie is configured to cross the intersection prior to performing the turn to position said boogie in a location to utilize the single predetermined corner.

17. A lift robot comprising:
a crate loader;
a bogie configured to travel along an array of a plurality of intersecting vertical and horizontal rack-based tracks in which rack segments extend along vertical and horizontal rails and are interrupted and absent in intersection regions thereof, wherein said bogie is configured to travel in a lateral motion mode along the horizontal rails and configured to travel in vertical mode along the vertical rails;
wherein said bogie comprising four rotatable holders, wherein each rotatable holder comprises a pair of pinions that are mounted in serial configuration thereon, said pair of pinions are configured to rotate at a same rotational speed in a first mode, and to rotate at different rotational speeds in a second mode, wherein said bogie is configured to utilize the first mode during the lateral motion mode and during the vertical motion mode, wherein said bogie is configured to utilize the second mode during transition between the lateral motion mode and the vertical motion mode; and
a motor, wherein a drive-shaft of the motor is configured to cause at least a portion of said four rotatable holders;
wherein said boogie is configured to perform a turn in an intersection using a single predetermined corner of the intersection, wherein said boogie is configured to cross the intersection after performing the turn to continue in a desired direction after utilizing the single predetermined corner.

\* \* \* \* \*

UNITED STATES PATENT AND TRADEMARK OFFICE
CERTIFICATE OF CORRECTION

PATENT NO. : 11,608,227 B2  
APPLICATION NO. : 16/479715  
DATED : March 21, 2023  
INVENTOR(S) : Shay Cohen, Guy Blotnik and Nadav Laor Page 1 of 1

It is certified that error appears in the above-identified patent and that said Letters Patent is hereby corrected as shown below:

On the Title Page

Item (72) Remove Inventor #4 ASAF KAUFMAN and Inventor #5 BAR COHEN.

Signed and Sealed this  
Eleventh Day of March, 2025

Coke Morgan Stewart  
*Acting Director of the United States Patent and Trademark Office*